United States Patent [19]
Kasashima et al.

[11] Patent Number: 5,131,084
[45] Date of Patent: Jul. 14, 1992

[54] METHOD AND APPARATUS FOR SYNCHRONIZATION MANAGEMENT OF TIMERS IN DISTRIBUTED DATA PROCESSING SYSTEM

[75] Inventors: Hirokazu Kasashima; Setsuo Kawakami, both of Hitachi; Shinji Hori, Mito; Toshio Endo, Hitachi; Kinji Mori, Yokohama; Katsumi Kawano, Fucyuu, all of Japan

[73] Assignee: Hitachi, Ltd., Tokyo, Japan

[21] Appl. No.: 497,815

[22] Filed: Mar. 22, 1990

Related U.S. Application Data

[63] Continuation of Ser. No. 70,431, Jul. 7, 1987, abandoned.

[30] Foreign Application Priority Data

Jul. 7, 1986 [JP] Japan ................................ 61-157838

[51] Int. Cl.⁵ .............................................. G06F 9/00
[52] U.S. Cl. ...................................... 395/325; 395/800; 364/DIG. 2; 364/950.5; 364/934.1
[58] Field of Search .................................. 395/800, 325; 364/DIG. 1-DIG. 2

[56] References Cited

U.S. PATENT DOCUMENTS

| | | | |
|---|---|---|---|
| 4,154,983 | 5/1979 | Pedersen | 179/15 AL |
| 4,337,463 | 6/1982 | Vangen | 340/825.3 |
| 4,531,185 | 7/1985 | Halpern et al. | 364/200 |
| 4,709,347 | 11/1987 | Kirk | 364/900 |
| 4,736,393 | 4/1988 | Grimes et al. | 340/825.2 X |
| 4,746,920 | 5/1988 | Nellen et al. | 375/107 X |

Primary Examiner—Thomas C. Lee
Assistant Examiner—L. Donaghue
Attorney, Agent, or Firm—Antonelli, Terry, Stout & Kraus

[57] ABSTRACT

A plurality of processors are connected to one another through a transmission line to constitute a distributed data processing system. Each processor adds a processor identification code to the time of its own and broadcasts them as time data at fixed periods. Each processor receives the time data on the transmission line, judges whether or not the received time data is the time data of the processor as the object of synchronization and sets the time data from the processor as the object of synchronization to the timer of its own system in order to synchronize the timers.

10 Claims, 5 Drawing Sheets

METHOD AND APPARATUS FOR SYNCHRONIZATION MANAGEMENT OF TIMERS IN DISTRIBUTED DATA PROCESSING SYSTEM

This application is a continuation of application Ser. No. 07/070,431, filed Jul. 7, 1987, now abandoned.

BACKGROUND OF THE INVENTION

This invention relates to a distributed data processing system of the type wherein a plurality of processors are connected to one another through a transmission line, and more particularly to a method and apparatus for synchronization management of timers of a plurality of processors for the same or each group.

A conventional timer synchronization management method is described, for example, in Japanese Patent Laid-Open No. 135,565/1984. According to this reference, a plurality of processors are connected to one another through a transmission line, a particular processor is defined as a "master" with the others being "slaves" for timer synchronization and the timer of each processor is synchronized by a synchronization instruction of the master processor.

However, such a conventional timer synchronization management method does not take into consideration back-up measures for possible extension and modification of the system and breakdown of the timer synchronization master system and hence involves the problems in extensibility, maintenance and reliability of the system.

In addition, it has been difficult in this prior art system to partially modify the time of processors forming the same group of the distributed data processing system for testing purpose.

SUMMARY OF THE INVENTION

It is a first object of the present invention to improve extensibility, maintenance and reliability of a distributed data processing system employing timer synchronization.

It is a second object of the present invention to improve testing efficiency in a distributed data processing system employing timer synchronization.

The first characterized feature of the present invention lies in that a master-slave relationship for timer synchronization is not employed but each processor selects an arbitrary processor at its own judgement and sets the time of the selected processor to the timer of its own system.

The second characterizing feature of the present invention lies in that each processor selects an arbitrary processor in the same group at its own judgement and sets the time of the selected processor to the timer of its own system.

In the present invention, each processor broadcasts the time of its own system on a transmission line, and each processor receives it from the transmission line. If the broadcasting processor has the time of the processor as the object of synchronization, the receiving processor sets the time to the timer of its own system, and the timers between the processors can thus be synchronized.

If the broadcasting processor has the time of the processor as the object of synchronization within a predetermined group, each receiving processor sets the time to the timer of its own system in order to synchronize the timers among the processors of the same group.

DESCRIPTION OF THE PREFERRED EMBODIMENTS

Figure 1:
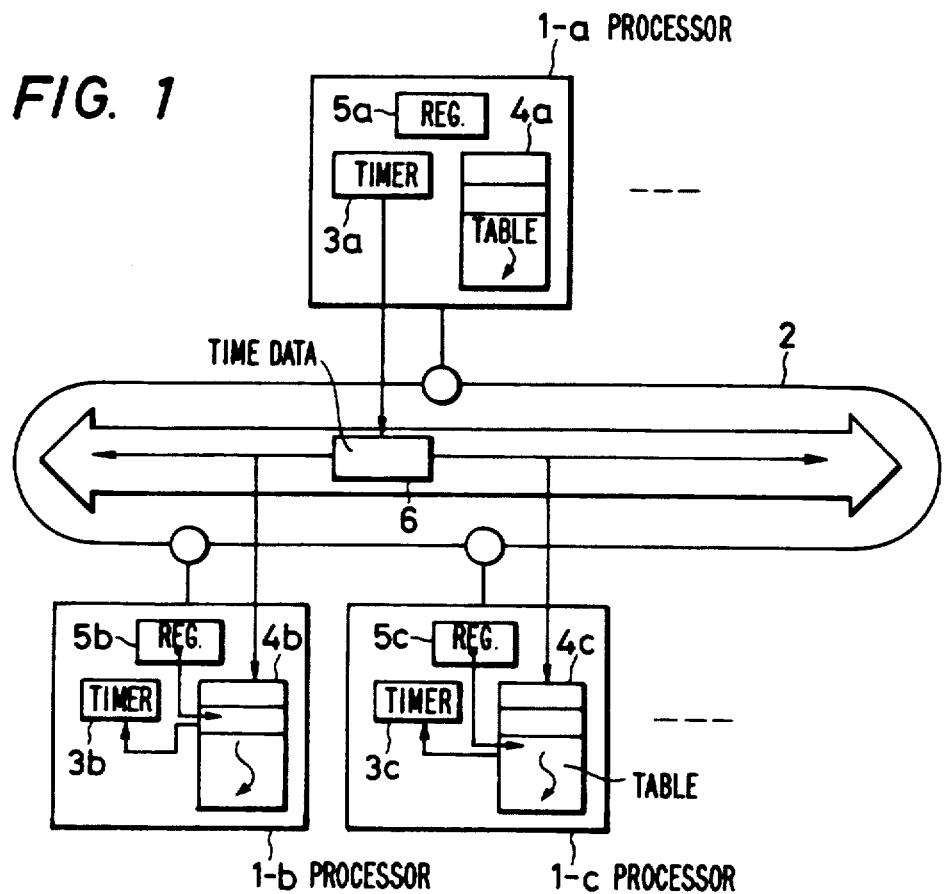
FIG. 1 is a block diagram showing a timer synchronization system in accordance with one embodiment of the present invention.

In FIG. 1, a plurality of processors 1 (a, b, c, . . . . ) are connected to one another through a transmission line 2. Each processor has a timer 3 (a, b, c, . . . ). The value of the timer 3a is broadcasted on the transmission line as time data 6. The timer data 6 is received by each processor 1-b, 1-c and stored in a timer synchronization table 4b, 4c. Each processor 1-b, 1-c reads out the time of a processor as the object of synchronization from the timer synchronization table 4b, 4c and sets it to the timer 3b, 3c of its own system.

Incidentally, a transmission system of control information using a common transmission line is disclosed, for example, in U.S. Pat. Specification No. 4,154,983 and well known in the art. Therefore, the present specification omits the description on such a system.

Figure 2:
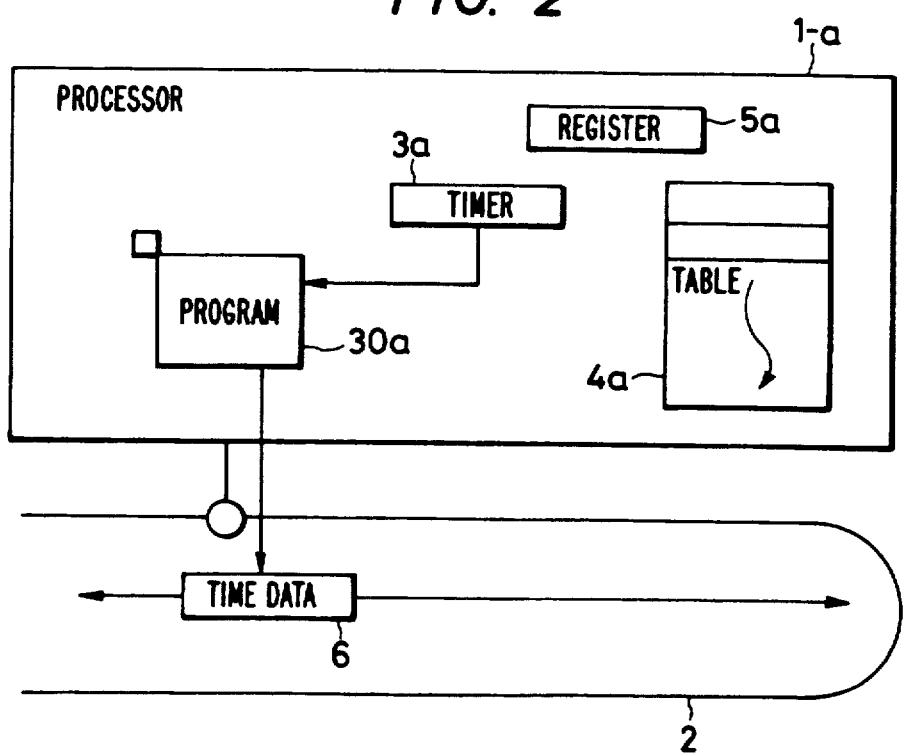
FIG. 2 is a block diagram showing a time data transmission system.

FIG. 2 shows a transmission system of the time data in the processor 1-a. A transmission program 30a reads out the time from the timer 3a of the processor 1-a and broadcasts it as time data 6 on the transmission line 2. At this time, the timer synchronization table 4a and a synchronization designation value 5a are not used.

Figure 3:
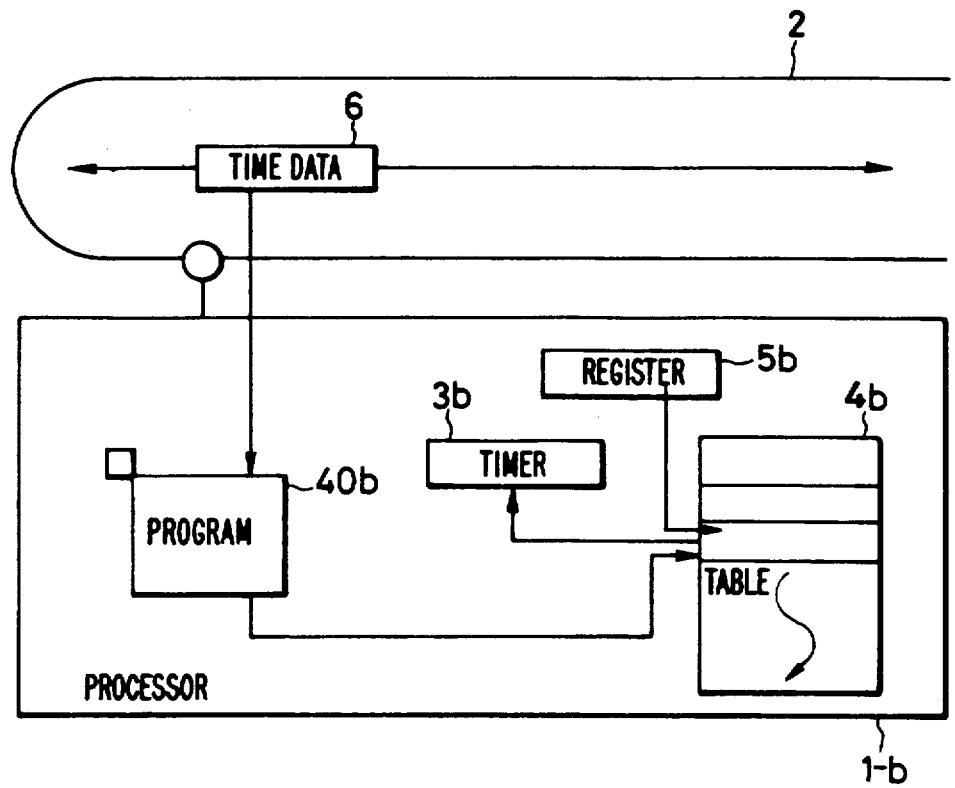
FIG. 3 is a block diagram showing a time data reception system.

FIG. 3 shows a reception system of the time data in the processor 1-b. The time data 6 broadcasted on the transmission line 2 is received by the reception program 40b inside the processor 1-b. The time data 6 thus received is stored in the timer synchronization table 4b. The timer of the processor designated by the synchronization designation value 5b is read out from the timer synchronization table 4b and set to the timer 3b of the processor 1-b. In this manner, the timers among the processors can be synchronized.

Figure 4:
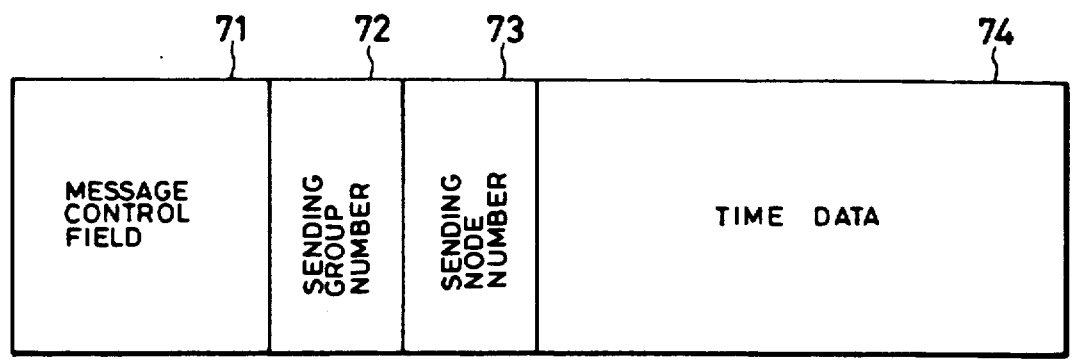
FIG. 4 shows a message format of the time data.

FIG. 4 shows a message format of the time data. The message broadcasted to the transmission line consists of a message control field 71, a transmititng group number 72, a transmitting node number and the time data 74.

Incidentally, the transmitting group number 72 may be omitted when management of each group unit is not effected.

The message control unit 71 contains identification information representing whether or not the message is the time data, or information representing the length of the message.

The time data 74 includes, for example, the data of year, month, day, time, minute and second.

Figure 5:
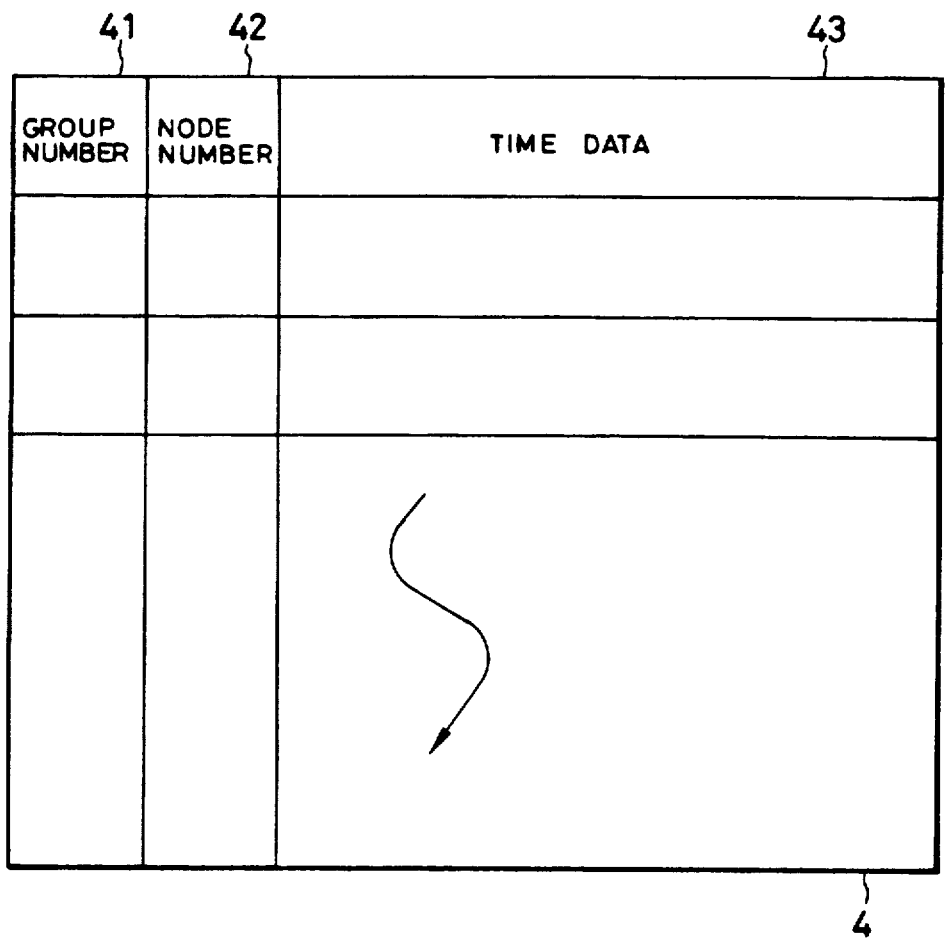
FIG. 5 shows a timer synchronization table.

FIG. 5 shows the timer synchronization table 4. One element of the timer synchronization table consists of a group number 41, a node number 42 and time data 43. The number of this table is preferably the same as the number of processors to be connected to the transmission line.

Incidentally, the group number may be omitted when management of group unit is not effected.

Figure 6:
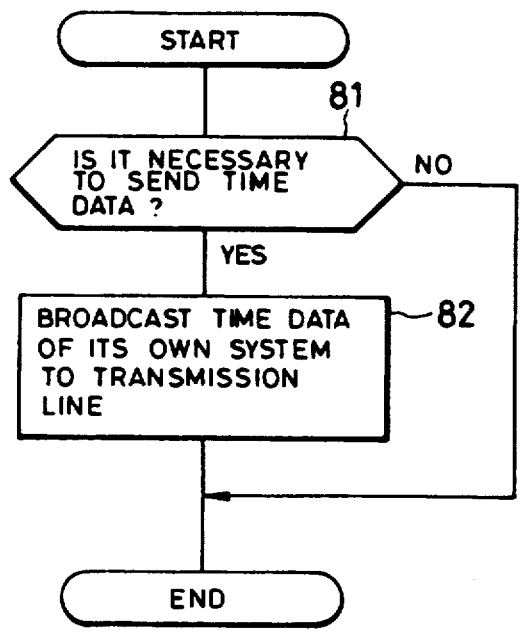
FIG. 6 is a flowchart showing transmission processing of the time data.

FIG. 6 shows transmission processing of the time data. Transmission processing is fundamentally evoked at predetermined periods. Whether or not transmission of the time data is necessary is judged at step 81. If it is judged necessary, the time data of its own system is broadcasted to the transmission line at step 82.

Figure 7:
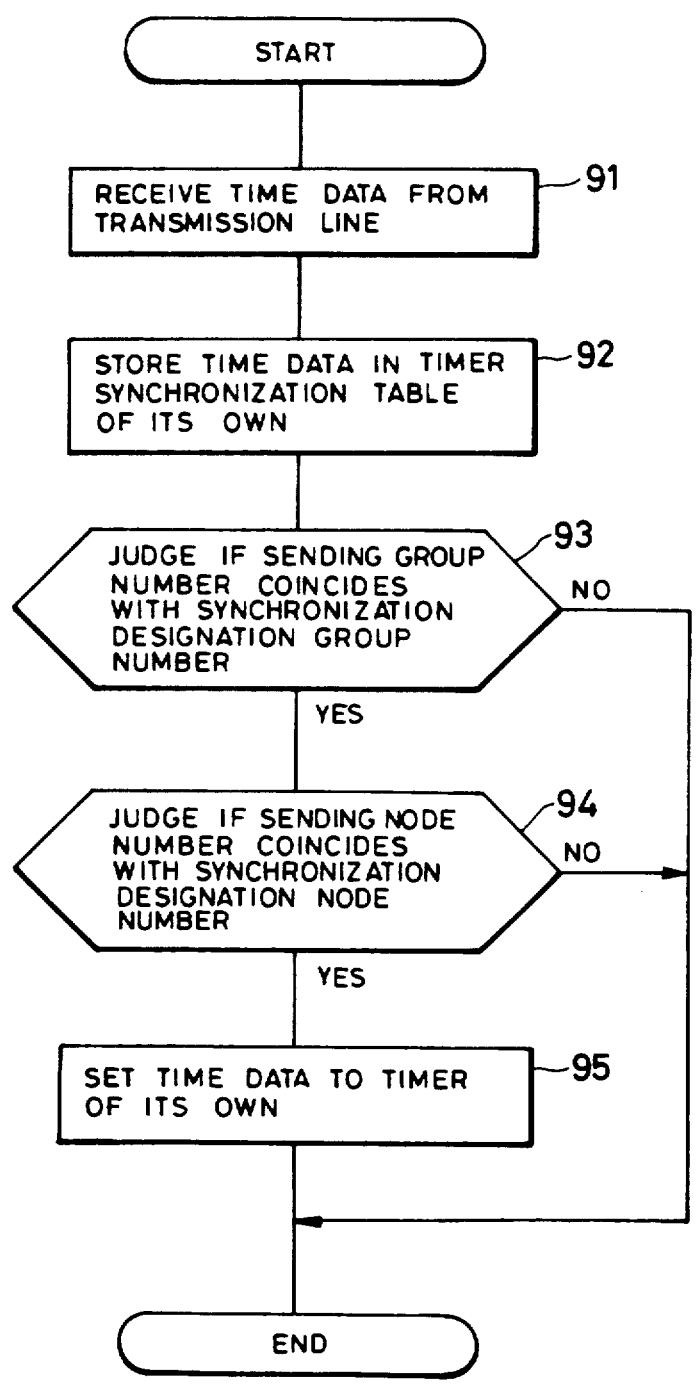
FIG. 7 is a flowchart showing reception processing of the time data.

FIG. 7 shows reception processing of the time data. The time data is received from the transmission line at step 91. The time data thus received is stored in the timer synchronization table of its own system at step 92. Next, whether or not the transmitting group number of the time data received is in conformity with the group number dealt with as the object of synchronization in its own system is judged at step 93. If they are in conformity, processing of step 94 is executed. Namely, at this step 94, whether or not the transmitting node (processor) number of the time data received is in agreement with the node number as the object of synchronization in its own system is judged. If they are in conformity, the time is set to the timer of its own system at step 95.

Judgement processing at step 93 is omitted if management of group unit is not effected and processing of step 94 is executed immediately after step 92.

Figure 8:
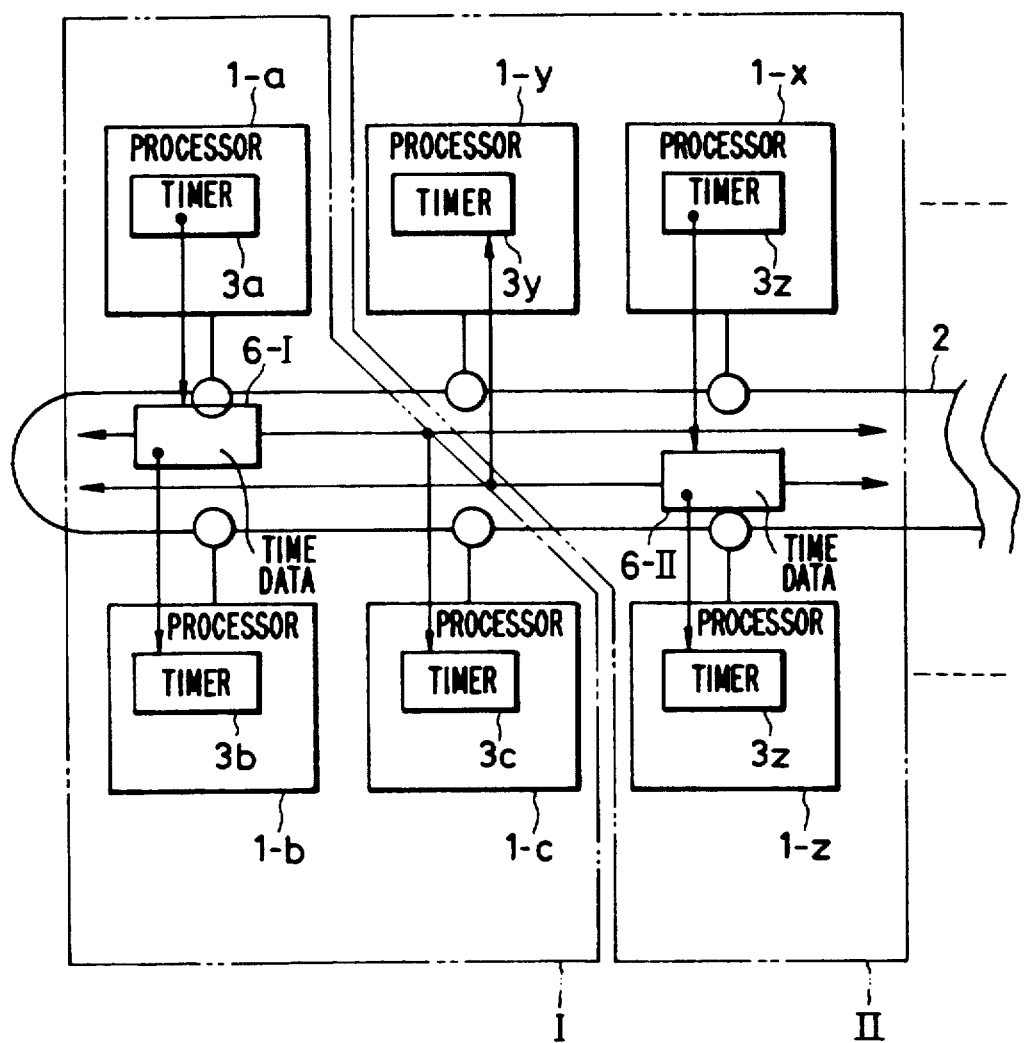
FIG. 8 is a block diagram showing another embodiment of the present invention.

FIG. 8 shows another embodiment of the present invention. The diagram shows the embodiment wherein the processors 1-a to 1-c are managed as a group I while the processors 1-x to 1-z are managed as another group II.

A plurality of processors 1-a to 1-z are connected to one another through the transmission line 2. The timers 3a, 3x of the processors 1-a, 1-x are broadcasted as the time data 6-I, 6-II to the transmission line 2, respectively. The time data 6-I, 6-II thus broadcasted are received by the processors 1-b, 1-c, 1-y, 1-z and synchronized with the timer of the processor as the object of synchronization within the same group I, II.

In accordance with the present invention, one group I can be used for on-line application while the other group II can be used for testing purpose, so that testing efficiency can be improved.

Since the timers among the processors can be synchronized irrespective of any change of the modes and configuration of the system, the present invention can improve extensibility, maintenance and reliability of the distributed data processing system.

Furthermore, the present invention can manage the processors for each group and can synchronize the timers among the processors of the same group. Therefore, the present invention can improve testing efficiency in the distributed data processing system in addition to the improvement in extensibility, maintenance and reliability of the system.

What is claimed is:

1. A distributed data processing system including a plurality of processors connected to one another through a transmission line wherein each processor includes a timer for synchronizing processing operations of said each processor and wherein said each processor further includes apparatus for synchronizing said timer to a timer of another processor, said apparatus comprising:

means for broadcasting a time, to which a processor identification code is added, from said timer, included in said each processor, as time data to said transmission line, said processor identification code identifying said each processor;

a memory having a plurality of areas corresponding to processors other than said each processor;

means for receiving time data on said transmission line from another processor and storing said time data in one of said plurality of areas of said memory corresponding to said another processor;

means for storing a processor identification code output by said each processor for identifying at least one processor of said plurality of processors having a timer to which said timer of said each processors is to be synchronized;

means for judging whether time data received from said transmission line is from said identified at least one processor by referring to said processor identification code stored in said means for storing; and means for setting said timer using said time data judged by said judging means to be from said identified at least one processor identified by said processor identification code.

2. The distributed data processing system according to claim 1, wherein at least one of said plurality of processors includes means for broadcasting time data to said transmission line at predetermined time periods.

3. A method of synchronizing timers in a distributed data processing system including a plurality of processors connected to one another through a transmission line wherein said processor includes a timer for synchronizing processing operations of said each processor and wherein said each processor further includes apparatus for synchronizing said timer to a timer of another processor, said apparatus includes a memory having a plurality of areas corresponding to processors other that said each processor, said method comprising the steps of:

(a) broadcasting a time, to which a processor identification code is added, of said timer of said each processor to said transmission line as time data, said processor identification code identifying said each processor;

(b) receiving time data on said transmission line from another processor and storing said time data in one of said plurality of areas of said memory, included in said apparatus of said each processor, said one area corresponding to said another processor;

(c) storing a processor identification code output by said each processor for identifying at least one processor of said plurality of processors having a timer to which said timer is to be synchronized;

(d) judging, whether said received time data is from said identified at least one processor by referring to said processor identification code stored in said storing step; and (e) setting said timer using said time data judged by said judging step to be from said identified at least one processor identified by said processor identification code.

4. A method of synchronizing timers in a distributed data processing system according to claim 3, wherein at least one of said plurality of processor includes means for broadcasting time data to said transmission line at predetermined time periods.

5. A method of synchronizing timers in a distributed data processing system according to claim 4, wherein said judging step includes a step of:
   (d1) comparing a processor identification code of said received time data to the processor identification code stored by said storing step; and
   (e1) said setting step is performed when the result of the comparison has a predetermined relationship.

6. A distributed data processing system including a plurality of processors divided into groups connected to one another by a transmission line, wherein each group includes some of said plurality of processors, wherein each processor of said each group includes a timer for synchronizing processing operations of said each processor, and wherein said each processor further includes apparatus for synchronizing said timer to a timer of another processor, each apparatus comprising:
   means for broadcasting time, to which a group number and a processor identification code are added, from said timer, of said each processor to which said apparatus belongs, as time data to said transmission line, said group number identifying a group to which said each processor belongs and said processor identification code identifying said each processor;
   a memory having a plurality of areas corresponding to processors in said system other than said each processor;
   means for receiving time data on said transmission line from another processor in said system and storing said time data in one of said plurality of areas of said memory corresponding to said another processor;
   means for storing a processor identification code output by said each processor for identifying at least one processor of said processors having a timer to which said timer is to be synchronized, said identified at least one processor being within a same group as said each processor;
   means for judging whether time data received from said transmission line is time data from said identified at least one processor within the same group as said each processor by referring to said processor identification code stored in said means for storing; and
   means for setting said timer using the timer data judged by said judging means to be from said identified at least one processor.

7. The distributed data processing system according to claim 6, wherein at least one of said processors of each of said groups includes means for broadcasting time data to said transmission line at predetermined time periods.

8. A method for synchronizing timers in a distributed data processing system including a plurality of processors divided into groups and connected to one another through a transmission line, wherein each group includes some of said plurality of processors, wherein each processor of said each group includes a timer for synchronizing processing operations of said each processor, and wherein said each processor further includes apparatus for synchronizing said timer to a timer of another processor, said apparatus further including a memory having a plurality of areas corresponding to processors in said system other than said each processor, said method comprising the steps of:
   (a) broadcasting a time, to which a group number and a processor identification coded are added, of said timer of said each processor to said transmission line as time data, said group number identifies a group to which said each processor belongs and said processor identification code identifies said each processor;
   (b) receiving, in said each processor, time data on said transmission line from another processor in said system and storing said time data in one of said plurality of areas of said memory included in said apparatus of said each processor, said one area corresponding to said another processor;
   (c) storing a group number and a processor identification code output by said each processor for identifying at least one processor of said plurality of processors having a timer to which said timer is to be synchronized, said identified at least one processor being within a same group as said each processor;
   (d) judging whether the received time data is from said identified at least one processor by referring to said processor identification code stored in said storing step; and
   (e) setting said timer using the time data judged by said judging step to be from said identified at least one processor.

9. The method of synchronizing timers in a distributed data processing system according to claim 7, wherein at least one of said processors of each of said groups broadcasts time data to said transmission line at predetermined time periods.

10. The method of synchronizing timers in a distributed data processing system according to claim 9, wherein said judging step includes a step of:
   (d1) comparing a group number and a processor identification code of said received time data broadcasted by a processor to a group number and a processor identification code stored by said storing step and
   (e1) said setting step is performed when the result of said comparison has a predetermined relationship.

* * * * *